(12) United States Patent
Regunathan et al.

(10) Patent No.: US 11,196,508 B1
(45) Date of Patent: Dec. 7, 2021

(54) TERMINAL RADIO CHARACTERIZATION

(71) Applicants: Murali Regunathan, Washington, DC (US); Douglas Ricker, Frederick, MD (US)

(72) Inventors: Murali Regunathan, Washington, DC (US); Douglas Ricker, Frederick, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 17/004,736

(22) Filed: Aug. 27, 2020

(51) Int. Cl.
*H04B 3/46* (2015.01)
*H04B 17/00* (2015.01)
*H04Q 1/20* (2006.01)
*H04L 1/00* (2006.01)

(52) U.S. Cl.
CPC .......... *H04L 1/0035* (2013.01); *H04L 1/0003* (2013.01); *H04L 1/0009* (2013.01); *H04L 1/0016* (2013.01); *H04L 1/0042* (2013.01); *H04L 1/0043* (2013.01)

(58) Field of Classification Search
CPC ... H04L 1/0035; H04L 1/0009; H04L 1/0016; H04L 1/0043; H04L 1/0042; H04L 1/0003

USPC .......................................................... 375/227
See application file for complete search history.

(56) References Cited

U.S. PATENT DOCUMENTS

| | | | |
|---|---|---|---|
| 2014/0269955 A1* | 9/2014 | Becker | H04B 1/06 375/259 |
| 2017/0268232 A1* | 9/2017 | Renke | E04B 2/707 |
| 2020/0169962 A1* | 5/2020 | Fakoorian | H04L 1/0026 |

\* cited by examiner

*Primary Examiner* — Tanmay K Shah
(74) *Attorney, Agent, or Firm* — Capitol City Techlaw; Jasbir Singh (57) ABSTRACT

A system and method for characterizing performance of a terminal radio. The method includes obtaining a plurality of SNR feedbacks by, for each input power level of varying input power levels of the terminal radio, estimating an SNR (signal-to-noise ratio) associated with a respective input power level for a burst sent from the terminal radio to a gateway, where each of the SNR feedbacks may include an estimated SNR and the respective input power level; and determining a RC (radio characterization) of the terminal radio based on where the SNR feedbacks start deteriorating without indicating a saturated response at the gateway, where bursts are transmitted at a selected frequency with a selected SYMCOD (symbol, modulation and error coding scheme).

21 Claims, 5 Drawing Sheets

| $BO_{MAX}$ | | | | Max |
|---|---|---|---|---|
| n | Number | 50 | | |
| p | 45 ms frames | 10 | | |
| s | dB | 1 | | |
| a | dB | 0.25*s | | |
| m | dB | 20 | | |
| r | dB | 0 | | |

FIG. 4

| Modulation | Minimum Back off |
|---|---|
| QPSK | $BO_{min}$ QPSK |
| 8PSK | $BO_{min}$ 8PSK |
| 16APSK | $BO_{min}$ 16APSK |
| 32APSK | $BO_{min}$ 32APSK |
| ... | ... |
| ... | |

FIG. 5

| Frequency | SNR | Difference |
|---|---|---|
| $f_{ref}$ | $SNR_{f_{ref}}$ | 0 |
| $f_{ref} + \Delta_f$ | $SNR_{(f_{ref}+\Delta_f)}$ | $\emptyset_{f_{ref}+\Delta_f} = SNR_{(f_{ref}+\Delta_f)} - SNR_{f_{ref}}$ |
| $f_{ref} + 2\Delta_f$ | $SNR_{(f_{ref}+2\Delta_f)}$ | $\emptyset_{f_{ref}+2\Delta_f} = SNR_{(f_{ref}+2\Delta_f)} - SNR_{f_{ref}}$ |
| $f_{ref} + 3\Delta_f$ | $SNR_{(f_{ref}+3\Delta_f)}$ | $\emptyset_{f_{ref}+3\Delta_f} = SNR_{(f_{ref}+3\Delta_f)} - SNR_{f_{ref}}$ |
| ... | ... | ... |
| $f_{ref} - \Delta_f$ | $SNR_{(f_{ref}-\Delta_f)}$ | $\emptyset_{f_{ref}-\Delta_f} = SNR_{(f_{ref}-\Delta_f)} - SNR_{f_{ref}}$ |
| $f_{ref} - 2\Delta_f$ | $SNR_{(f_{ref}-2\Delta_f)}$ | $\emptyset_{f_{ref}-2\Delta_f} = SNR_{(f_{ref}-\Delta_f)} - SNR_{f_{ref}}$ |
| ... | ... | ... |

FIG. 6

| Minimum Backoff Values | | | | |
|---|---|---|---|---|
| Modulation<br>Frequency | QPSK | 8PSK | 16APSK | ... |
| $f_{ref}$ | $BO_{min}\ QPSK + \mu_{offset}$ | $BO_{min}\ 8PSK$ | $BO_{min}\ 16APSK$ | ... |
| $f_{ref} + \Delta_f$ | $BO_{min}\ QPSK + \emptyset_{f_{ref}+\Delta_f} + \mu_{offset}$ | $BO_{min}\ 8PSK + \emptyset_{f_{ref}+\Delta_f} + \mu_{offset}$ | | |
| $f_{ref} + 2\Delta_f$ | $BO_{min}\ QPSK + \emptyset_{f_{ref}+2\Delta_f} + \mu_{offset}$ | $BO_{min}\ 8PSK + \emptyset_{f_{ref}+2\Delta_f} + \mu_{offset}$ | | |
| $f_{ref} + 3\Delta_f$ | $BO_{min}\ QPSK + \emptyset_{f_{ref}+3\Delta_f} + \mu_{offset}$ | $BO_{min}\ 8PSK + \emptyset_{f_{ref}+3\Delta_f} + \mu_{offset}$ | | |
| ... | | ... | | |
| $f_{ref} - \Delta_f$ | $BO_{min}\ 8PSK + \emptyset_{f_{ref}-\Delta_f} + \mu_{offset}$ | $BO_{min}\ 8PSK + \emptyset_{f_{ref}-\Delta_f} + \mu_{offset}$ | | |
| $f_{ref} - 2\Delta_f$ | | | | |
| ... | | | | |

TERMINAL RADIO CHARACTERIZATION

FIELD

A system and method to characterize terminals with unknown radio parameters is disclosed. The characterization increases utilization efficiency of the terminals in the network and reduces interference among terminals. A SNR (Signal to Noise Ratio) feedback from a gateway is used to characterize the radio performance across the operating frequencies of the terminal.

BACKGROUND

Presently, there is a wide range of terminal radios and systems available and deployed. This leads to a host of configuration related power issues. These can be dealt by manually configuring each site to best reflect in installed radio's performance and the associated system parameters. In many instances, insufficient information about the network and terminal performance make the configuration infeasible.

Using a terminal with unknown radio characteristics can lead to suboptimal performance for the terminal, and, increased interference for the other terminals in the system. Without limitation, the increased interference may be because of using a linear amplifier/radio close to or into saturation thereby causing increased EVM (Error Vector Magnitude) and ACI (Adjacent-channel interference), The prior art manually characterizes the terminal. The manual characterization involves calibration on every terminal, usually at the terminal location, to obtain a correct back off value. Further, the manual process uses a radio specification that might or might not be available. The present teachings characterize the performance using an automated process without using any extra equipment that an installer would have to bring to each terminal location.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A SNR (Signal to Noise Ratio) feedback from a receiver/gateway is used to characterize terminals with unknown radio parameters. The characterization reduces interference among terminals and increases utilization efficiency of the terminals in the network across the operating frequencies of the network. The characterization determines the back off value for the terminal amplifier for one or more of the SYMCOD (Symbol, Modulation and Error Coding Scheme) and link parameters used by the terminal such that the EVM (Error Vector Magnitude) and ACI (Adjacent-channel interference) are optimal.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for characterizing performance of a terminal radio. The method includes obtaining a plurality of SNR feedbacks, for each input power level of varying input power levels of the terminal radio, estimating an SNR (signal-to-noise ratio) associated with a respective input power level for a burst sent from the terminal radio to a gateway, where each of the SNR feedbacks may include an estimated SNR and the respective input power level; and determining a RC (radio characterization) of the terminal radio based on where the SNR feedbacks start deteriorating without indicating a saturated response at the gateway, where bursts are transmitted at a selected frequency with a selected SYMCOD (symbol, modulation and error coding scheme). Other embodiments of this aspect include corresponding computer systems, apparatus, and computer programs recorded on one or more computer storage devices, each configured to perform the actions of the methods.

Implementations may include one or more of the following features. The method where the determining is performed at a terminal that receives the estimated SNR from the gateway for a respective burst. The method where the bandwidth may include allocating the selected frequency and the selected SYMCOD for a duration. The method where the ACI (adjacent-channel interference) is reduced by restricting a use of the selected frequency for the duration by an adjacent channel. The method may include: repeating the obtaining and the determining for each SYMCOD of supported SYMCODs; and collating a RC-by-modulation table from the repeating. The method may include: segmenting a supported frequency range into frequency segments; repeating the obtaining and the determining for each of the frequency segments; and collating a RC-by-frequency table from the repeating. The method may include: repeating the obtaining and the determining for each SYMCOD of supported SYMCODs; collating a RC-by-modulation table from the repeating; and generating a RC table that combines the RC-by-modulation table and the RC-by-frequency table. The method may include: receiving a request to transmit at a frequency and a SYMCOD; retrieving an input power level from the RC table based the frequency and the SYMCOD; and transmitting with the input power level. The method where the burst may include bursts at the respective input power level and the estimated SNR may include an average of the estimated SNR for each of the bursts. The method may include adjusting the radio characterization for an operating temperature of the terminal radio. Implementations of the described techniques may include hardware, a method or process, or computer software on a computer-accessible medium.

One general aspect includes a system to characterize performance of a terminal radio. The system also includes a terminal to obtain a plurality of SNR feedbacks by, for each input power level of varying input power levels of the terminal radio, estimating a signal-to-noise ratio (SNR) associated with a respective input power level for a burst sent from the terminal radio to a gateway, where each of the SNR feedbacks may include an estimated SNR and the respective input power level; and a generate RC table module to determine a RC (radio characterization) of the terminal radio based on where the SNR feedbacks start deteriorating without indicating a saturated response at the gateway, where bursts are transmitted at a selected frequency with a selected SYMCOD (symbol, modulation and error coding scheme). Other embodiments of this aspect include corresponding computer systems, apparatus, and computer programs recorded on one or more computer storage devices, each configured to perform the actions of the methods.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings are directed to characterizing terminals with unknown radio parameters.

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

INTRODUCTION

The present teachings characterize a terminal radio to enable efficient utilization of terminals in a radio network. The characterization also reduces interference with other terminals in the network. The present teachings do not involve any extra equipment and instead use a SNR (signal to noise ratio) feedback from a GW (Gateway) to characterize the radio performance. In some embodiments, the characterization determines a back off value for a terminal amplifier such that the EVM (Error Vector Measure) and ACI (Adjacent Channel Interference) based on selected symbol rate, modulation and link parameters are optimal. In some embodiments, the terminal characterization may be performed across one or more of the operating frequencies of the terminal.

Characterizing the Radio Performance

Characterization of the radio performance is generally done in a controlled environment with measurement equipment. In the absence of a controlled environment with measurement equipment and without any local feedback at the terminal, the present teachings transmit bursts from the terminal (for example over an inroute), receive feedback about the Inroute SNR from a receiver (disposed for example at a gateway), and use that information to characterize the radio performance. In addition to the terminal radio characteristics, the Inroute SNR at the gateway receiver may be affected by other components such as thermal noise, system interference and ACI.

In some embodiments, some of the variables affecting the SNR can be assumed to be constant when the characterization is done in clear sky. In some embodiments, varying ACI effects may be mitigated by stopping traffic on the adjacent frequency channels during the characterization. As such, the terminal radio should be the only varying contributor to the SNR. Under these conditions, varying the terminal radio input power or input back off and recording the Inroute SNR allows for determination of the characterization. Since the performance may differ for different modulations and different transmit frequencies, the characterization may be performed for each combination separately.

Due to the time-consuming nature of the process and the high number of combinations possible, in some embodiments characterization of all the modulations may be done at one frequency and the characterization across frequency may be done using only one modulation.

Figure 1:
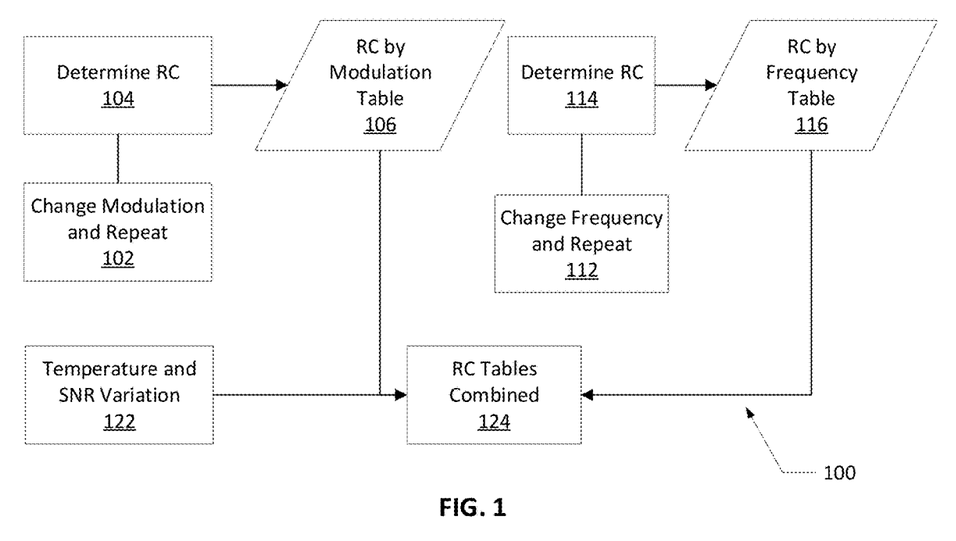
FIG. 1 illustrates a method for characterizing a transmitter according to various embodiments.

FIG. 1 illustrates a method for characterizing a transmitter according to various embodiments. The functions of the GW and the terminal are as follows.

Figure 5:
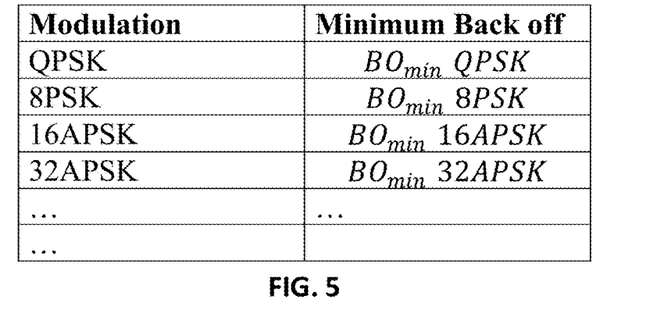
FIG. 5 illustrates an exemplary RC-by-modulation table according to various embodiments.

A method 100 may include an operation 102 to perform RC (radio characterization) for each modulation supported by a terminal at a selected frequency. The operation 102 may perform RC for one modulation at a time. The determination of RC for a selected modulation may be performed one at a time by operation 104. Operation 102 may change modulation and repeat the determination per operation 104 as needed. The determining per operation 104 may vary a terminal radio input power or input back off, record the terminal radio input power with an Inroute SNR as reported by a receiver, and to determine the RC of the terminal for the selected modulation and frequency. In general, the terminal radio input back off has a one-to-one relationship with terminal radio output back off. Results of operation 104 may be recorded in an RC-by-modulation table 106. The RC for each supported modulation may be determined for only one of the frequencies supported by the terminal in operation 104. An exemplary RC-by-modulation table 106 is illustrated in FIG. 5.

Figure 6:
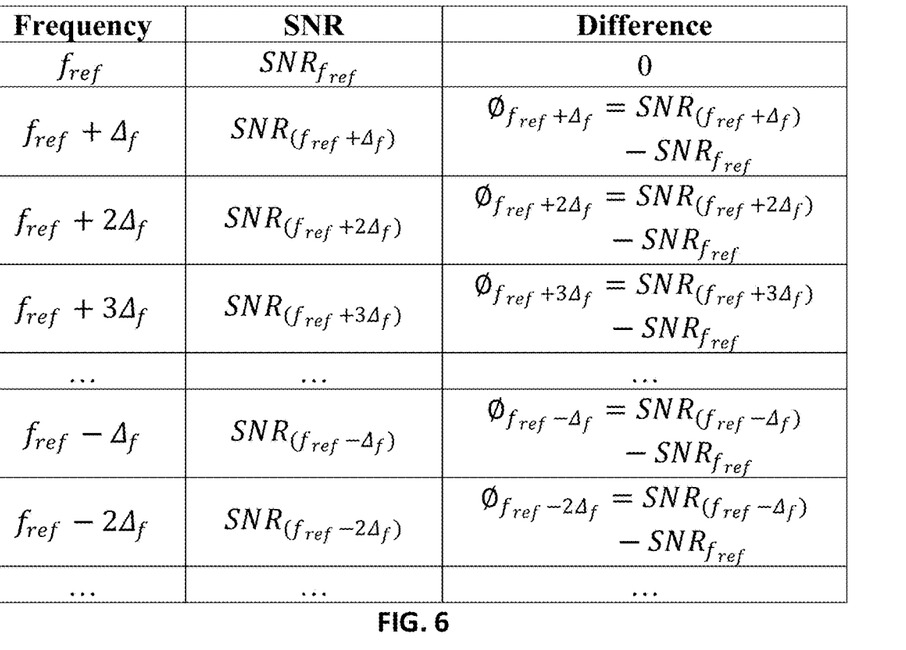
FIG. 6 illustrates an exemplary RC-by-frequency table according to various embodiments.

A method 100 may include an operation 112 to perform RC for each frequency supported by a terminal. The operation 112 may perform RC one frequency at a time. The RC for a selected frequency may be performed one at a time by operation 114. Operation 112 may change the frequency and repeat the operation 114 as needed. Operation 114 may vary a terminal radio input power or input back off, and record an Inroute SNR as reported by a receiver to determine the RC of the terminal for the selected frequency. Results of operation 114 may be recorded in an RC-by-frequency table 116. The RC for each supported frequency may be determined for only one of the modulations supported by the terminal in operation 114. An exemplary RC-by-frequency table 116 is illustrated in FIG. 6.

The method 100 may further include operation 124 to combine the RC-by-modulation table 106 with the RC-by-frequency table 116 to generate a RC combined table.

When the characterization is done, the RC combined table may be updated to reflect an operating temperature of the transmitter being characterized and to account for an SNR value for variations in the final combined tables of transmitter characterization per operation 122.

Figure 2:
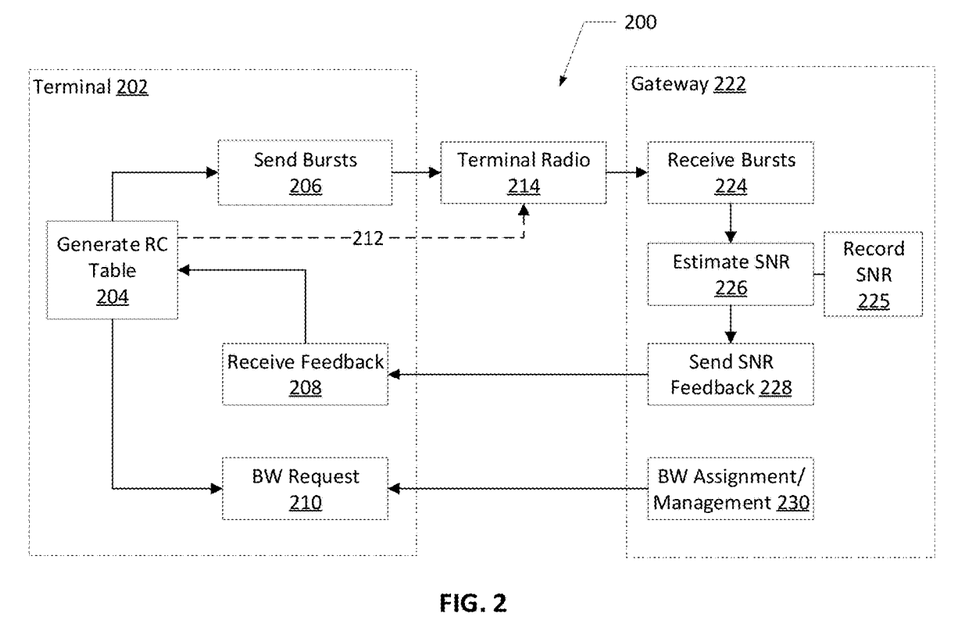
FIG. 2 illustrates an exemplary radio network system to perform radio characterization.

FIG. 2 illustrates an exemplary radio network system to perform radio characterization.

An exemplary radio network system 200 may include a terminal 202, a terminal radio 214 and a gateway 222. The gateway 222 may receive bursts 224, estimate an SNR of received bursts 226, record the estimated SNR 225, and send the estimated SNR as SNR feedback 228 back to the terminal 202. In some embodiments, the gateway 222 may provide bandwidth assignment and management 230. The bandwidth assignment and management 230 allocates bandwidth in response to a bandwidth request 210 from the terminal 202. The bandwidth request 210 may specify the frequency and symbol rate being characterized.

The terminal 202 may execute the radio characterization. Terminal 202 may send bursts 206 with the terminal radio 214 and receive an SNR feedback 208 from the gateway 222. In some embodiments, the SNR feedback 208 from the gateway 222 may be received via radio communications. Prior to the send bursts 206, the terminal 202 may vary/change radio parameters 212 of the terminal radio 214 to match a selected modulation and a selected frequency. The terminal may receive SNR feedback 208 from the gateway 222. In some embodiments, multiple SNR feedbacks may be performed to determine an average SNR feedback at the selected modulation and/or frequency. The SNR feedback 208 is used to generate an RC table 204. In some embodiments, the averaging of the SNR feedback may be performed during the generate RC table 204.

In some embodiments, the terminal 202 may send a bandwidth request 210 prior to the send bursts 206. While the radio characterization takes place, the bandwidth allocation in response to the bandwidth request 210 may reduce the effect of ACI variations by leaving unused one or more adjacent frequency channels. In some embodiments the bandwidth request 210 may specify the frequency and modulation to be used for satisfying the bandwidth allocation needed for the characterization.

Figure 3:
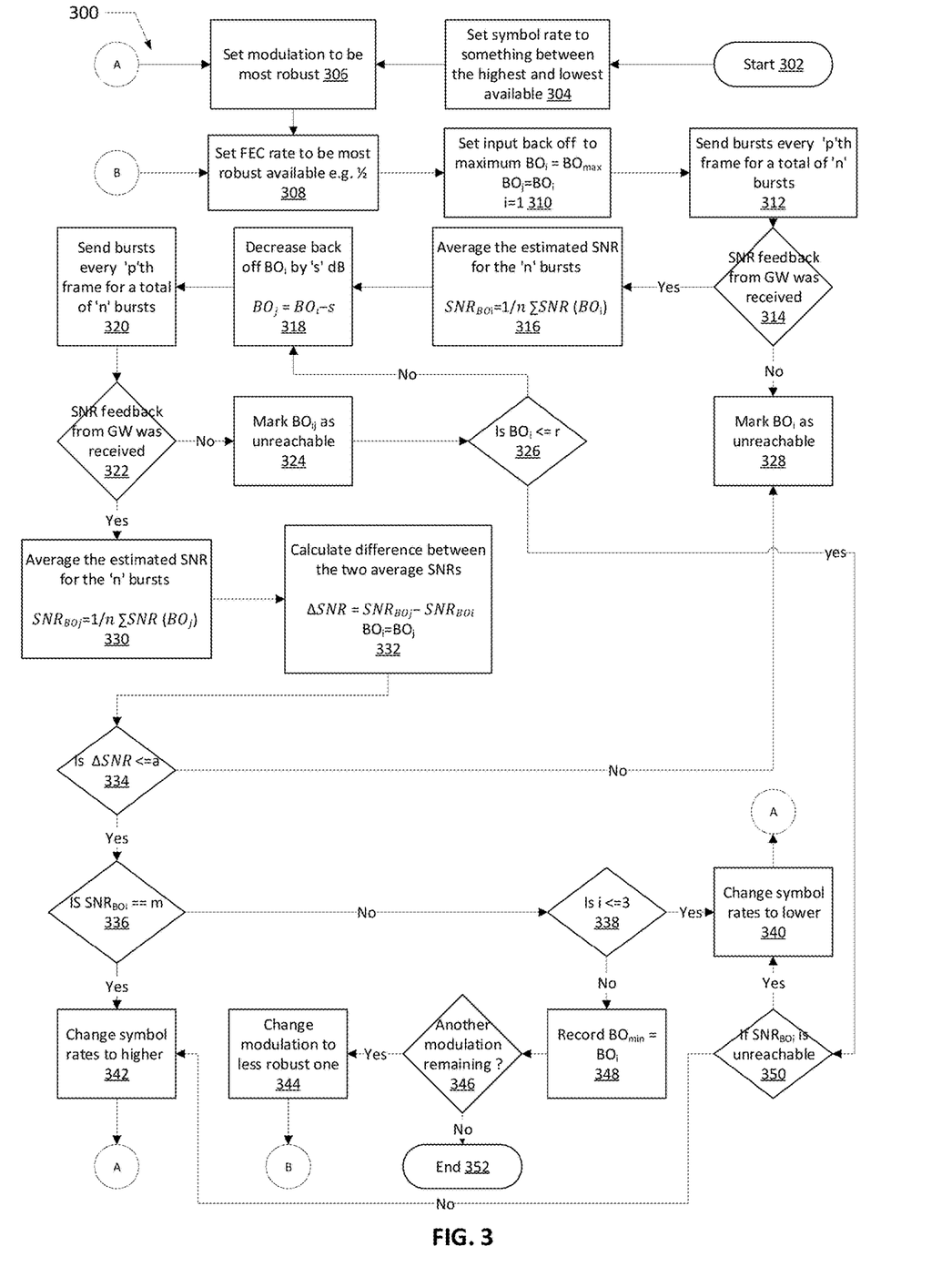
FIG. 3 illustrates a flowchart of a method for characterizing a transmitter according to various embodiments.

FIG. 3 illustrates a flowchart of a method for characterizing a transmitter according to various embodiments.

The flowchart of FIG. 3 may be characterized as the following pseudocode:

1. Start (302) by setting the modulation to a symbol rate that is neither the highest nor lowest symbol rate (304) available in the spectrum, for example, QPSK, FEC rate 1/2
2. Set the modulation to be the most robust (306) and input back off to $BO_i=BO_{MAX}$ (308)
3. Set input back off to maximum $BO_i=BO_{max}$, $BO_j=BO_i$ and i=1 (310)
4. Send 'n' bursts spaced 'p' frames apart each (312).
5. When SNR feedback from the gateway was received (314), Average the received SNR feedback from the gateway over the 'n' bursts (316); Record this SNR value (348). If no feedback is received from the gateway (314), mark the entry as 'unreachable' (328). The average SNR may be calculated as:

$$SNR_{BO_i} = 1/n \sum_1^n SNR(BO_i),$$

where $BO_i$ is the ith Back off

6. Decrease back off by 's' dB (318) and repeat the sending (320).

$$SNR_{BO_j} = 1/n \sum_1^n SNR(BO_j) \text{ where } BO_j = BO_i - s$$

7. If both sends (318, 320) were valid and neither was unreachable, then calculate the SNR (330). Otherwise go to boundary condition check (350)
8. Calculate and record the difference between the SNR values from the two sends (332)

$$\Delta_{SNR} = SNR_{BO_j} - SNR_{BO_i}$$

Set $BO_i = BO_j$

9. Determine if difference in SNR values is meaningful (Is $\Delta_{SNR} <= a$) (334)
    a. Is $SNR_{BO_i} == m$ (336) is true then go to step 12 (342)
    b. Else
        i. Is T<=3 is true (338) then go to step 11 (340)
        ii. Else go to step 13 (348)
    Else the difference in SNR values is not meaningful then go to (328)
10. Is $BO_i \le r$ true (326)
    a. If $SNR_{BO_i}$ is unreachable (350) then go to step 11 (340)
    b. Else Go to step 12 (still linear) (342)
    Else go to step 2 (306)
11. Change symbol rates to lower one and repeat
12. Change symbol rates to higher one and repeat
13. Record the back off value $BO_{min} = BO_i$ (348)
14. Change modulation to other available modulations (for example 8PSK, 16APSK, and 32APSK) (346, 344) and repeat steps 2 to 13 to obtain different minimum back off values for each modulation type.

Figure 4:
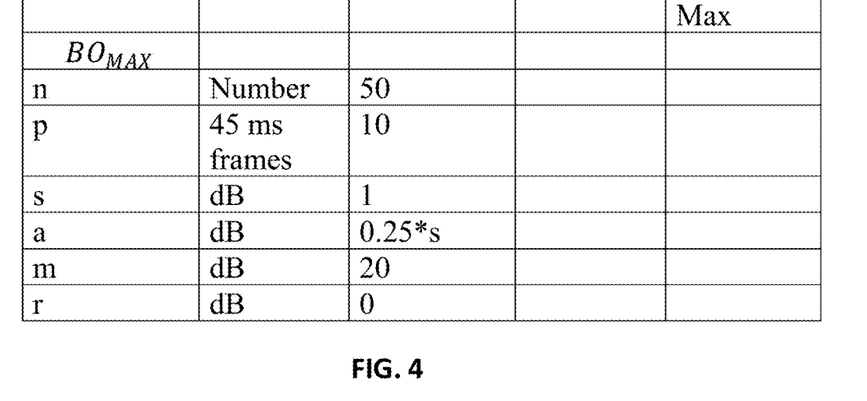
FIG. 4 illustrates exemplary parameters for use with a process to determine characterization according to various embodiments.

FIG. 4 illustrates exemplary parameters for use with a process to determine characterization according to various embodiments. FIG. 5 illustrates an exemplary RC-by-modulation table according to various embodiments. FIG. 6 illustrates an exemplary RC-by-frequency table according to various embodiments.

As the characteristics of the radio are different across frequencies, the above methodology may be repeated at different frequencies supported by the transmitter. However, this is a time-consuming process. Assuming that the difference is mainly in the total gain of the amplifier and not its nonlinear response, in some embodiments it is sufficient to record the gain across frequencies alone. To do this, the terminal may set the modulation (for example, QPSK), FEC rate to be the most robust supported and input backoff to be the minimum calculated when generating the RC-by-modulation table described above (for example, $BO_{min}$ QPSK corresponding to modulation QPSK) and transmit at different frequencies in the operating range. Since the difference in gain is noticeable only across major steps (for example, 10 MHz or above steps or segments), the whole operating frequency range can be covered in major steps (stepsize=$\Delta f$).

To generate a RC-by-frequency table, the terminal 202 may send 'n' number of bursts to the gateway 222, receive the feedback SNR, and average the feedback SNRs to get a SNR measure for each frequency segment. The difference in the average SNR at each step and the SNR at the frequency ($f_{ref}$) where the MOD characterization was performed is calculated and stored in a RC table by frequency (for example, FIG. 6). This RC table by frequency allows the terminal to adjust the input back off according to the desired power at a selected inroute frequency.

Figure 7:
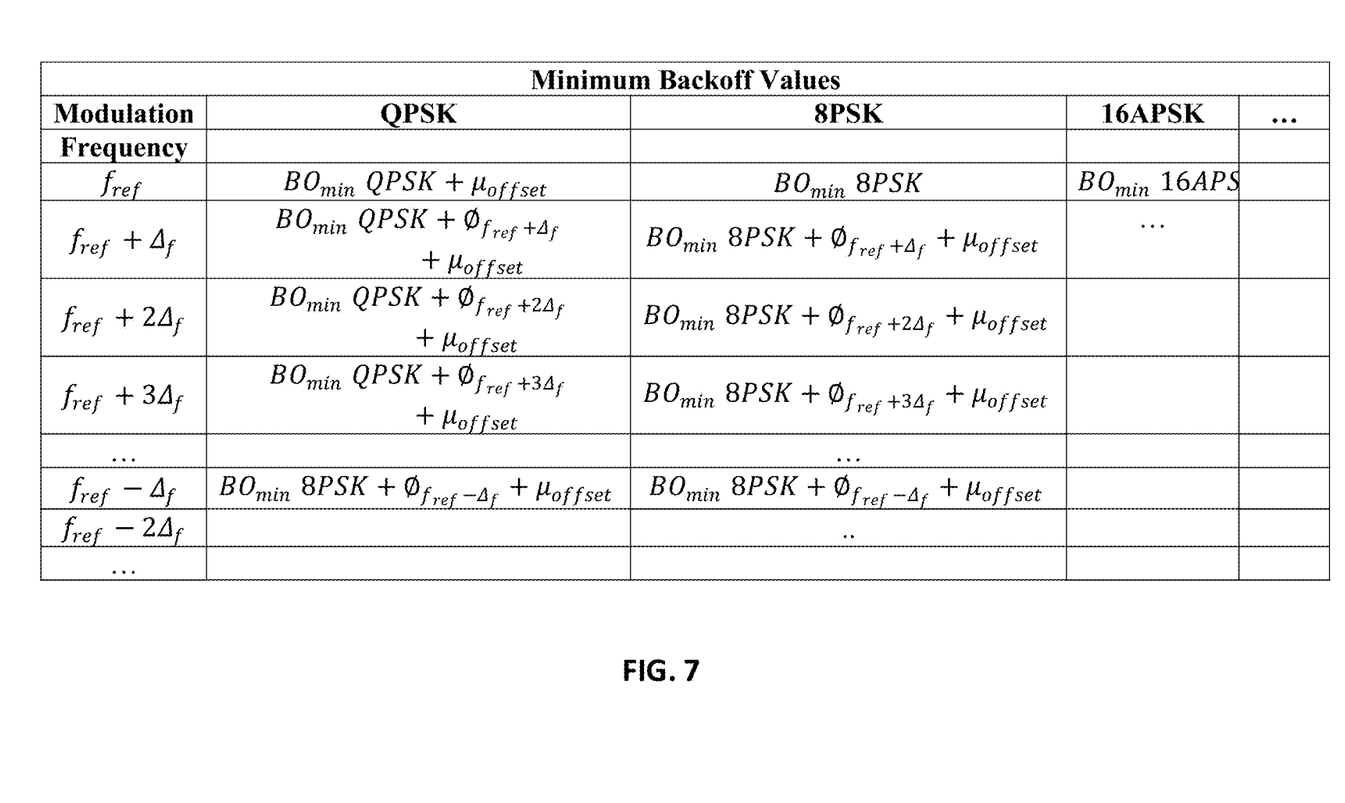
FIG. 7 illustrates an exemplary combined RC table according to various embodiments.

FIG. 7 illustrates an exemplary combined RC table according to various embodiments.

An RC table by modulation may be combined with an RC table by frequency table. The combined table may be used to form a combined 2D matrix of back off values for each combination of modulation and frequency. While forming this combined table, an extra offset for temperature ($T_{offset}$) and SNR ($SNR_{offset}$) may be subtracted from the backoff values.

$$\mu = T_{offset} + SNR_{offset}$$

Using the Table

A terminal may use the combined table by looking up a closest frequency in the table to a frequency of operation. The terminal may then lookup the minimum back off value to use based on the modulation being used.

Simulation Results

Figure 8:
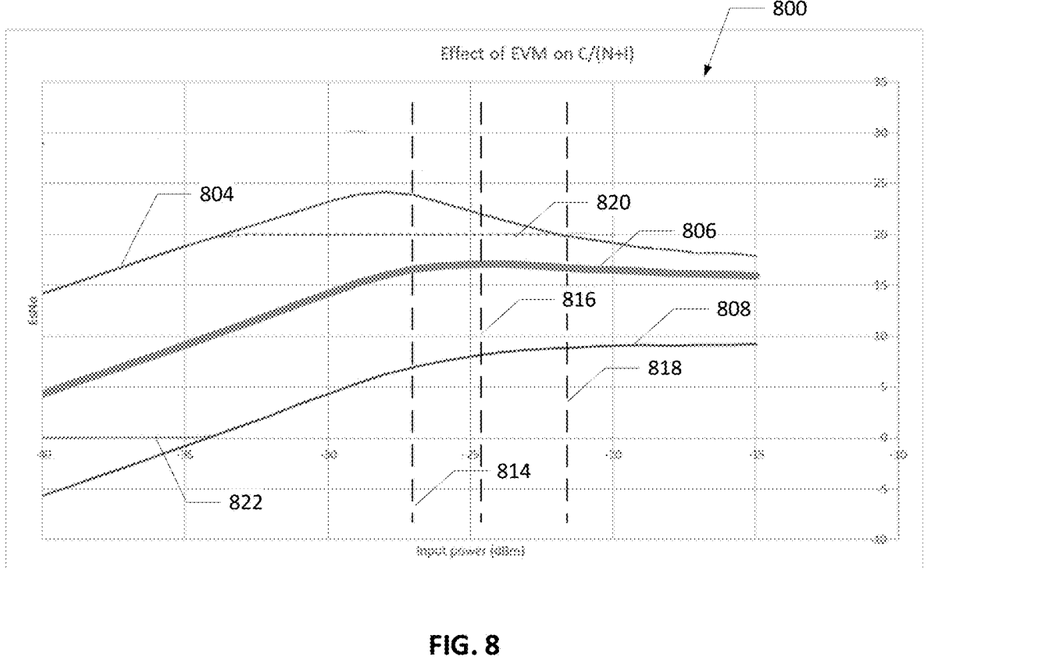
FIG. 8 charts a received SNR at a gateway against a transmit input power at a terminal according to various embodiments.

FIG. 8 charts a received SNR at a gateway against a transmit input power at a terminal according to various embodiments.

FIG. 8 illustrates a chart 800 illustrating a change in Receive Error Vector Measure (Rx EVM) and Receive Signal to Noise Ratio (Rx SNR) with a change in terminal power. The Rx SNR is displayed as EsNo (Energy per Symbol/Noise in 1 Hz) and the input power is displayed as dBm (decibel-milliwatts). Line plot 804, 806 and 808 illustrate SNR curves for different Carrier/Noise (C/N) ratio in a link. Line 814 depicts where the line plot 804 starts deteriorating. Line 816 depicts where the line plot 806 starts deteriorating. Line 818 where the line plot 808 starts deteriorating. The present methodology will discard the line plot 804 because of the saturated gateway response. The line plot 806 should be the one used to estimate the minimum input back off but if the line plot 808 were to be used, then it might result in the input back off being set a little higher.

In FIG. 8, line 820 notes that the gateway estimates terminal saturation level at 20 dBm when operating per line plot 804. Line 822 notes that the gateway estimates terminal saturation level at 0 dBm when operating per line plot 808.

Figure 9:
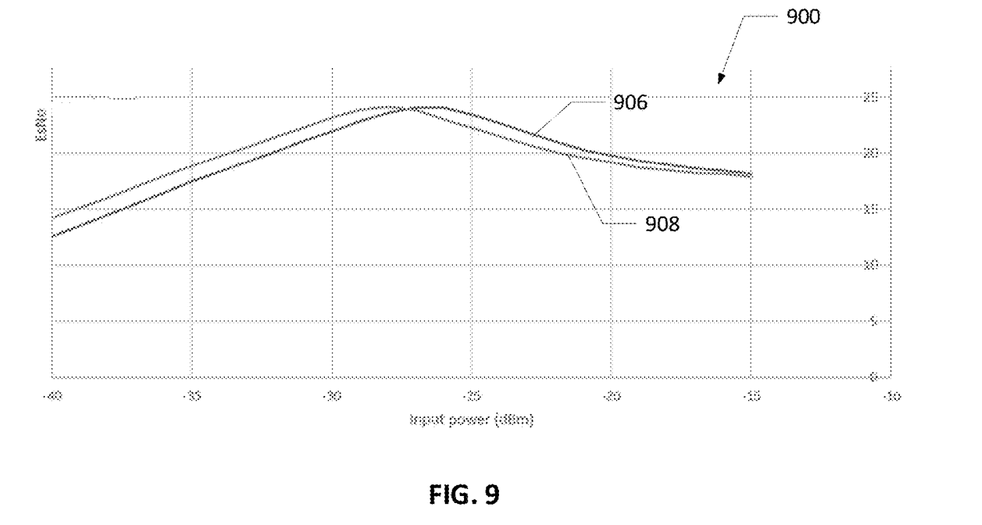
FIG. 9 charts a difference in the minimum back off due to the temperature of the system according to various embodiments.

FIG. 9 charts a difference in the minimum back off due to the temperature of the system according to various embodiments.

A chart 900 illustrates a difference in the minimum back off due to the temperature of the system. To allow for temperature variation, in some embodiments a back off may be set at least 2 dB below this number, i.e., $T_{offset}=2$. In some embodiments, temperature based back off values and back off values for different symbol rates leading to different C/N may be based an operating temperature of the system. Line plot 906 illustrates the effect on amplifier linearity and gateway RX SNR, when the amplifier is operating at 55° C. Line plot 908 illustrates the effect on amplifier linearity and gateway RX SNR, when the amplifier is operating at 40° C.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A method for characterizing performance of a terminal radio, the method comprising:
   obtaining a plurality of SNR feedbacks, for each input power level of varying input power levels of the terminal radio, estimating an SNR (signal-to-noise ratio) associated with a respective input power level for a burst sent from the terminal radio to a gateway, wherein each of the SNR feedbacks comprises an estimated SNR and the respective input power level; and
   determining a RC (Radio Characterization) of the terminal radio based on where the SNR feedbacks start deteriorating without indicating a saturated response at the gateway,
   wherein bursts are transmitted at a selected frequency with a selected SYMCOD (Symbol, Modulation and Error Coding Scheme).

2. The method of claim 1, wherein the determining is performed at a terminal that receives the estimated SNR from the gateway for a respective burst.

3. The method of claim 1, further comprising allocating bandwidth for the obtaining, wherein the bandwidth comprises allocating the selected frequency and the selected SYMCOD for a duration by the gateway.

4. The method of claim 3, wherein ACI (Adjacent-channel interference) is reduced by restricting a use of the selected frequency on an adjacent channel for the duration.

5. The method of claim 1, further comprising:
   repeating the obtaining and the determining for each SYMCOD of supported SYMCODs; and
   collating a RC-by-modulation table from the repeating.

6. The method of claim 1, further comprising:
   segmenting a supported frequency range into frequency segments;
   repeating the obtaining and the determining for each of the frequency segments; and
   collating a RC-by-frequency table from the repeating.

7. The method of claim 6, further comprising:
   repeating the obtaining and the determining for each SYMCOD of supported SYMCODs;
   collating a RC-by-modulation table from the repeating; and
   generating a RC table that combines the RC-by-modulation table and the RC-by-frequency table.

8. The method of claim 7, further comprising:
   receiving a request to transmit at a frequency and a SYMCOD;
   retrieving an input power level from the RC table for the frequency and the SYMCOD; and
   transmitting with the input power level.

9. The method of claim 1, wherein the burst comprises bursts at the respective input power level and the estimated SNR comprises an average of the estimated SNR for each of the bursts.

10. The method of claim 1, further comprising adjusting the radio characterization for an operating temperature of the terminal radio.

11. A system to characterize performance of a terminal radio, the system comprising:

a terminal to obtain a plurality of SNR feedbacks by, for each input power level of input power levels of the terminal radio, estimating a signal-to-noise ratio (SNR) associated with a respective input power level for a burst sent from the terminal radio to a gateway, wherein each of the SNR feedbacks comprises an estimated SNR and the respective input power level; and a generate RC table module to determine a RC (Radio Characterization) of the terminal radio based on where the SNR feedbacks start deteriorating without indicating a saturated response at the gateway, wherein bursts are transmitted at a selected frequency with a selected SYMCOD (Symbol, Modulation and Error Coding Scheme).

12. The system of claim 11, wherein the terminal receives the estimated SNR from the gateway for a respective burst.

13. The system of claim 11, wherein the terminal is allocated bandwidth, wherein the allocated bandwidth comprises the selected frequency and the selected SYMCOD for a duration by the gateway.

14. The system of claim 13, wherein an ACI (Adjacent-channel interference) is reduced by restricting a use of the selected frequency on an adjacent channel for the duration.

15. The system of claim 11, wherein the terminal repeats the obtaining and the determining for each SYMCOD of supported SYMCODs, and collates a RC-by-modulation table.

16. The system of claim 11, wherein the terminal segments a supported frequency range into frequency segments, repeats the obtaining and the determining for each of the frequency segments, and collates a RC-by-frequency table.

17. The system of claim 16, wherein the terminal repeats the obtaining and the determining for each SYMCOD of supported SYMCODs, collates a RC-by-modulation table from the repeating, and generates a RC table that combines the RC-by-modulation table and the RC-by-frequency table.

18. The system of claim 17, wherein the terminal receives a request to transmit at a frequency and a SYMCOD, retrieves an input power level from the RC table for the frequency and the SYMCOD; and transmits with the input power level.

19. The system of claim 11, wherein the burst comprises bursts at the respective input power level and the estimated SNR comprises an average of the estimated SNR for each of the bursts.

20. The system of claim 11, wherein the terminal adjusts the radio characterization for an operating temperature of the terminal radio.

21. The method of claim 1, wherein the RC determines a minimum back off value for the selected SYMCOD.

* * * * *